United States Patent [19]

Offterdinger

[11] 4,240,765
[45] Dec. 23, 1980

[54] CORNER CONSTRUCTION

[76] Inventor: Hermann F. Offterdinger, 602 Galway Dr., Burlington, Ontario, Canada, L7L 2S8

[21] Appl. No.: 34,458

[22] Filed: Apr. 27, 1979

[51] Int. Cl.² ............................................. F16D 7/04
[52] U.S. Cl. ................................... 403/402; 40/152; 52/656; 29/155 R
[58] Field of Search .................. 403/401, 402, 282; 29/155 R; 52/656, 657; 40/152, 155

[56] References Cited

U.S. PATENT DOCUMENTS

| 2,973,831 | 3/1961 | Sprouse et al. | 403/401 X |
| 3,031,047 | 4/1962 | Williams | 40/155 X |
| 3,205,599 | 9/1965 | Spertus | 403/401 X |
| 3,782,054 | 1/1974 | Goss, Jr. | 403/401 X |

*Primary Examiner*—Andrew V. Kundrat
*Attorney, Agent, or Firm*—Hirons, Rogers & Scott

[57] ABSTRACT

A corner construction comprises a pair of extruded frame elements with mitered ends connected at a joint plane. The frame elements include an H section part comprising web and parallel flange portions and the web of the H section part of one element is pressed to be sheared from its flanges and extend across the joint plane and engage snugly between the flanges of the other section to align the corner and make it rigid.

4 Claims, 6 Drawing Figures

U.S. Patent  Dec. 23, 1980  Sheet 1 of 2  4,240,765
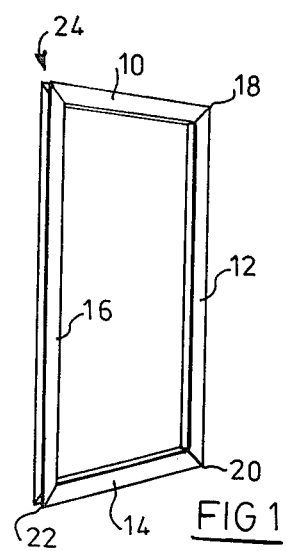
FIG 1
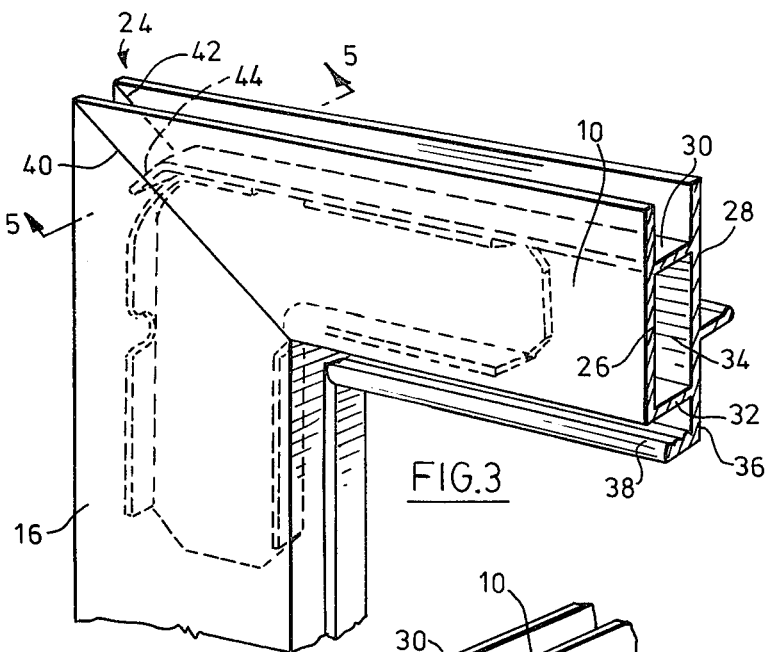
FIG. 3
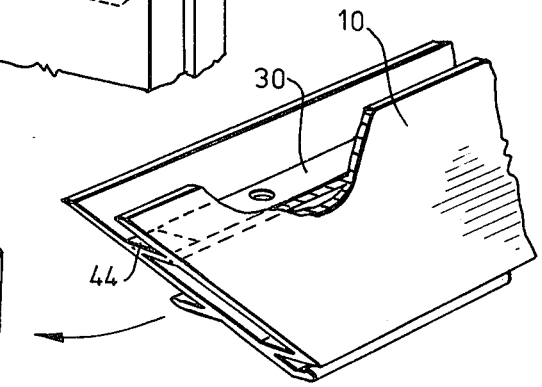
FIG. 2
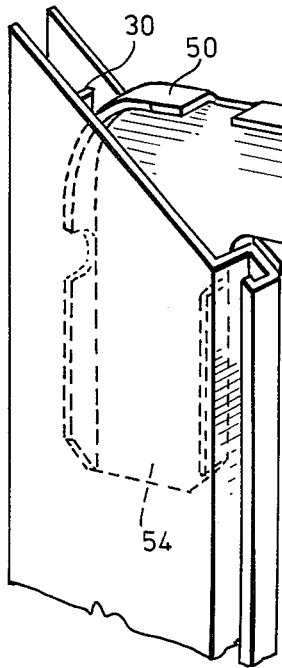
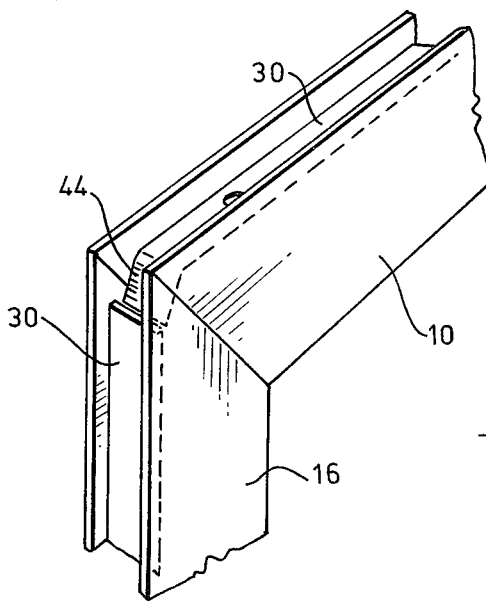
FIG. 4
FIG. 5

CORNER CONSTRUCTION

FIELD OF THE INVENTION

This invention is concerned with frames and in particular with corner constructions for frame elements. The invention is concerned particularly, but not necessarily exclusively, with the connection of extruded frame elements.

REVIEW OF THE PRIOR ART

Such frame elements are commonly used in, for example, the construction of sliding doors or windows. Conventionally, a pair of extruded elements are connected at their mitered ends by an L-shaped connector piece, one limb of which is received within a channel of one element with the other received in the channel of the second element. The connecting element may be secured in position by interaction between that connector and the channels of the frame element or by means of screws or other devices. However, tolerances in the manufacture of the frame elements and of the connector result in such corners having play and in the sides of the frame elements not being perfectly aligned.

DEFINITION OF THE INVENTION

The present invention seeks to alleviate this problem and, according to one aspect, comprises a corner construction having two frame elements of the same cross section and having matching mitered ends brought together at a joint plane, the cross sections and frame elements comprising a portion of H-shape, the cross piece of the portion of H-shape constituting a web between spaced parallel side walls.

The H section part of the frame elements of the present invention can also be considered to comprise two parallel flanges joined by an interconnecting web. The end region of the web of one frame element is pressed from the plane of the remainder of the web so as to be sheared therefrom and to extend across the joint plane and engage snugly between the inner surfaces of the flanges of the second frame element and make the connection or corner aligned and rigid.

Most desirably the flanges of the H section part of the frame elements are interconnected at a location spaced from the web so that there is defined a rectangular section channel or passageway for the reception of one limb of an L-shaped connector element.

Also according to the present invention there is provided a method of assembling a frame which comprises taking a pair of frame elements having the same cross section, each section including an H-shaped part comprised of opposed flanges and a connecting web, mitering corresponding ends of the frame elements and assembling them to form a corner with the mitered ends of those elements on a joint plane, and pressing an end portion of the web of one of the elements so that it is sheared from its respective flange portions and extends across the joint plane and is engaged between the flanges of the H-shaped part of the other of the frame elements with its sheared edges in engagement with the corresponding flange walls to align the frame elements accurately with respect to one another.

A preferred embodiment of the present invention is illustrated, schematically, in the accompanying drawings in which:

FIG. 1 shows a frame having corner constructions according to the present invention;

FIG. 2 is an exploded view of a corner construction prior to its formation according to the present invention;

FIGS. 3 and 4 are perspective view of a corner construction according to the present invention;

FIG. 5 is a cross section on the line 5—5 of FIG. 3; and

Figure 6:
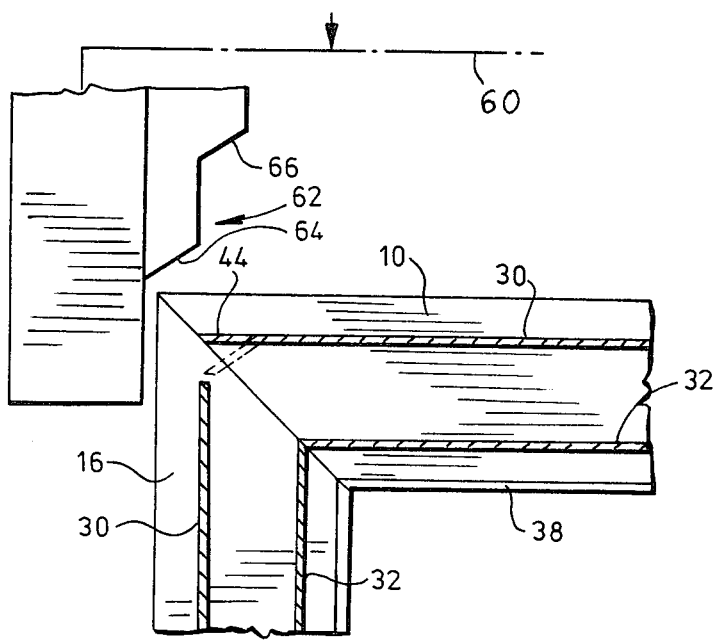
FIG. 6 is a schematic illustration showing the manner in which the corner construction is made.

The frame in FIG. 1 is typical of those used for example as sliding door and window frames and comprises frame elements 10, 12, 14 and 16 which are, in this instance, aluminum extrusions joined at corners 18, 20, 22 and 24. Corner 24 is illustrated in greater detail in FIGS. 2 through 6.

The section of the extrusions is most clearly seen in FIG. 3 and each extrusion comprises a section having an H-section part comprising opposed flanges 26 and 28 connected by a web 30. At a region spaced from web 30 the flanges 26 and 28 are connected by a cross piece 32 which, together with web 30 and adjacent parts of flanges 26 and 28, forms a rectangular channel or passage 34 which, in a manner described hereinafter, receives a connector element.

Flange 28 is extended as at 36 and has an inwardly turned rib 38 serving as a support piece for holding a panel element. The structure forms, per se, no part of the present invention and, for this reason, is not described in greater detail herein.

In making a corner joint according to the present invention, the adjacent ends of a pair of frame elements are mitered and brought together on a joint plane which includes the edges 40, 42 of the flanges of the sections.

As can be seen particularly in FIG. 2, an end portion of the flange 30 of one of the frame elements, in the region of the mitered end of that frame element, is removed. Most conveniently the removal of this portion is effected during the formation of various apertures which are made in the frame elements for the reception of locks and wheel elements.

As can be seen particularly in FIGS. 3, 4 and 5, the adjacent end portion 44 of the flange 30 of the other of the frame elements is folded over so that it extends across the joint plane and is engaged between the flanges of the H section of the other frame element.

Most desirably the end portion 44 is folded over during the assembly of the frame and the connection of that end portion to the flanges is sheared so that the end portion extends across the space between the flanges of the other of the frame elements and engages the opposed surfaces of those flanges rigidly to support the corner construction.

An L-shaped connecting element 50 is disposed to have one limb 52 within the rectangular passageway 34 of one frame element and its other limb 54 within the corresponding passageway of the second frame element forming the corner.

The manner in which the corner is assembled is illustrated in FIG. 6. A corner is loosely made as shown in FIG. 6 with an L-shaped connector, omitted in the interest of clarity, in position. The corner is mounted in a suitable frame (not shown) and a pressing bar, indicated by a chain line at 60, is then moved downward in the direction of the arrow toward the element 10. The pressing bar carries a forming member indicated at 62 which has a first portion 64 which is received within and closely conforms to, the channels defined by the flanges of the frame elements 10 and 16 and the webs of those frame element. The insertion of section 64 into those channel causes the elements to be aligned. As the pressing bar 60 is further advanced a forming surface 66 is brought into engagement with the end portion 44 of the adjacent web and first presses the two elements 10 and 16 into firm engagement at the corner and thereafter causes the connection to the adjacent flange portion of the web end portion to be sheared. Thereafter, that end portion is moved to the position shown in chain line in which it extends across the joint plane and in which its sheared edges snugly engage adjacent portions of the inside surfaces of the flanges of frame element 16 thus locking the corner in place.

It will be recognized that in a commercial machine four forming members 62 will be used so that all the corners will be formed simultaneously. Further, it will be appreciated that in certain instances it may be desirable to avoid the necessity to remove a portion of the web of one of the frame elements making up a corner. In that case the surface 66 can be so shaped as to produce an overlapping of both end portions of the webs of the adjacent frame elements, in which case some shearing of the web of the element 16 will also take place.

I claim:

1. A corner construction comprising two frame elements of substantially similar cross section having matching mitered ends brought together at a joint plane, the cross section of said frame elements comprising a portion of H-shape having two spaced parallel side walls, the cross piece of the portion of H-shape which cross piece extends between the said two parallel side walls constituting a web, a portion of the web of one element adjacent to the mitered end of that element being sheared from its respective side wall portion and pressed from the plane containing the remainder of the web to extend across the joint plane and between the side wall portion of the other element with its sheared edges engaging the said side wall portions to align the two frame elements accurately with respect to one another.

2. A corner construction comprising two frame elements of substantially similar cross section, the cross section having an H-shaped part made up of two spaced parallel opposed flanges and a connecting web, said frame elements having matching mitered ends, an end portion of the web of one of said elements adjacent said mitered end thereof being sheared from its respective flange portion, extending across the joint plane and being received snugly between the flanges of the other of said frame elements with its sheared edges engaging the said flange portions to align the two frame elements accurately with respect to one another.

3. A corner construction as claimed in claim 2 wherein an end portion of the web of the other of said frame elements adjacent the mitered end thereof, is removed to provide a space accommodating the said sheared end portion of the said one element.

4. A method of assembling a frame which comprises taking a pair of frame elements of the same cross section, each cross section including an H-shaped part comprised of opposed parallel flanges and a connecting web, mitering corresponding ends of the frame elements and assembling them to form a corner with the mitered ends of those elements in a joint plane, and pressing an end portion of the web of one of the elements by means of a tool that engages between the opposed flanges of the element so that the end portion is sheared from its respective flange portions and extends across the joint plane and is engaged snugly between the flanges of the other of the frame elements with its sheared edges in engagement with the corresponding flange walls to align the frame elements accurately with respect to one another.

* * * * *